No. 646,306. Patented Mar. 27, 1900.
R. MÜLLER.
DEVICE FOR FASTENING SPOKES TO RIMS OF WHEELS.
(Application filed Aug. 30, 1899.)
(No Model.)
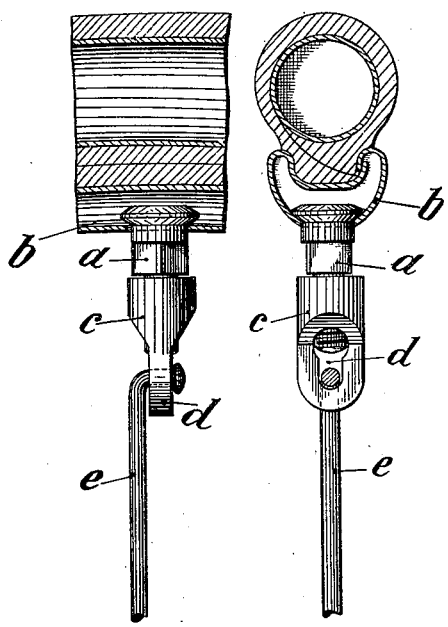

UNITED STATES PATENT OFFICE.

RICHARD MÜLLER, OF LEMGO, GERMANY.

DEVICE FOR FASTENING SPOKES TO RIMS OF WHEELS.

SPECIFICATION forming part of Letters Patent No. 646,306, dated March 27, 1900.

Application filed August 30, 1899. Serial No. 728,941. (No model.)

*To all whom it may concern:*

Be it known that I, RICHARD MÜLLER, merchant, a subject of the King of Prussia, Emperor of Germany, residing at Lemgo, St. Johannes Thor, (whose post-office address is Lemgo,) in the Kingdom of Prussia and Empire of Germany, have invented certain new and useful Improvements in a Device for Fastening the Spokes to the Rims of Cycle and other Wheels, of which the following is a full, clear, and exact description.

This invention relates to an improved device for fastening the spokes to the rims of cycle and other wheels which differs, essentially, from the means heretofore employed for that purpose in that it renders it unnecessary to form screw-threads on the outer ends of the spokes, and in the event of a spoke breaking it can be replaced by any suitable piece of wire.

The invention is specially valuable for the very broad wheels of American cycles, in which the india-rubber tires are so cemented that the air-tube must always be torn in order to get the screwed end of an ordinary spoke into place.

The accompanying sheet of drawings illustrates the invention applied to the rim of a cycle-wheel.

Figure 1 is a longitudial sectional elevation, and Fig. 2 a sectional elevation taken at right angles to Fig. 1.

$a$ is a screwed stem which is passed through a hole in the outer wall of a hollow rim $b$ and has a cylindrical neck which fits and rotates in said hole in the hollow rim and a broadened-out head which bears against the inside of the said rim, while the stem itself can be rotated in the hole in the rim by means of a key applied to the square part of the stem $a$. $c$ is a kind of stirrup-piece forming a nut which is tapped with a screw-thread to correspond to the screw-thread on the stem $a$ and is provided with a flattened part having a slot $d$ formed therein. The end of the spoke $e$ is bent and furnished with a rivet-head, as shown, and is then hooked into the slot $d$. Then by turning the screwed stem $a$, while the part $c$ is prevented from turning, the spoke $e$ is tightened up as may be required.

What I claim, and desire to secure by Letters Patent, is—

The combination of the hollow rim $b$, the screw-stem $a$ having a head retained within the coating of the hollow rim and bearing against the outer wall thereof, a cylindrical neck fitting and rotating in an aperture in said outer wall of the hollow rim, an external square for the reception of a turning-key, and a screw-threaded extremity; the stirrup-piece $c$ having an internal screw-thread to receive the threaded extremity of the stem and a slot $d$; and the spoke $e$ having a bent and headed end retained in the slot $d$ as shown and described.

In witness whereof I subscribe my signature in presence of two witnesses.

RICHARD MÜLLER.

Witnesses:
  HEINRICH HEMPEL,
  WILLIAM FIEDLER.